United States Patent
Yamada et al.

[15] 3,693,518
[45] Sept. 26, 1972

[54] MEMORY CIRCUIT OF AN ELECTRIC SHUTTER

[72] Inventors: Takeo Yamada, Tokyo; Shigeo Ono, Yokohama-shi, both of Japan

[73] Assignee: Nippon Kogaku K.K., Tokyo, Japan

[22] Filed: Jan. 2, 1968

[21] Appl. No.: 695,200

[52] U.S. Cl. ............................ 95/10 CT, 95/53 EB
[51] Int. Cl. ............................ G01j 5/30, G03b 7/08
[58] Field of Search ................ 95/53, 10; 250/214

[56] References Cited

UNITED STATES PATENTS

| | | | |
|---|---|---|---|
| 3,533,348 | 10/1970 | Yanagi | 95/10 C |
| 3,503,314 | 3/1970 | Tanabe | 95/10 C |
| 3,474,713 | 10/1969 | Mori et al. | 95/10 C |
| 3,486,434 | 12/1969 | Suzuki et al. | 95/10 C X |
| 3,179,808 | 4/1965 | Grey et al. | 95/53 X |
| 3,504,603 | 4/1970 | Brzonkala | 95/10 C |
| 3,429,242 | 2/1969 | Yoshida et al. | 95/10 C |
| 3,205,767 | 9/1965 | Weber | 95/10 |
| 3,324,779 | 6/1967 | Nobusawa | 95/10 X |
| 3,336,850 | 8/1967 | Otani | 95/10 |
| 3,368,468 | 2/1968 | Rentschler | 95/10 |
| 3,433,140 | 3/1969 | Wick | 95/10 |
| 3,437,027 | 4/1969 | Straub | 95/53 X |
| 3,452,658 | 7/1969 | Krull | 95/10 X |

*Primary Examiner*—Joseph F. Peters, Jr.
*Assistant Examiner*—Russell E. Adams, Jr.
*Attorney*—Anton J. Wille

[57] ABSTRACT

An exposure control arrangement for a camera having an objective lens and a shutter moveable between closed and open positions is disclosed. A light intensity to voltage conversion means is positioned behind the objective lens for converting essentially each value of the intensity of the light passing through the objective lens during use of the camera to a voltage having a value essentially linearly proportional to a logarithm of the value of said intensity, and a capacitor memory means is selectively coupled to the conversion means for storing this voltage. Switch means are provided for selectively coupling the capacitor memory means to the conversion means during intervals when light passing through the objective lens is incident on the conversion means and for disconnecting the capacitor memory means from the conversion means when the light passing through the objective lens is not incident on the conversion means. The camera shutter is actuated by a control means which is coupled to the capacitor memory means and which controls the open time of the shutter in accordance with the voltage stored in the capacitor memory means.

13 Claims, 6 Drawing Figures

MEMORY CIRCUIT OF AN ELECTRIC SHUTTER

In electronic exposure controlled single lens reflex cameras, it has become the practice to provide the light intensity sensing element within the camera body to provide increased flexibility of the camera in an interchangeable lens system. When, for example, the light sensing element is provided on the back surface of the pentaprism, the movement of the mirror out of the lens-film path prevents light from falling on the light sensing element. This, then, requires that the light intensity be somehow memorized before the movement of the mirror.

In cameras utilizing typical exposure meters, wherein a voltage source, resistor, and photoconductor (i.e., a resistor whose resistance varies with light intensity) are series connected, it has been proposed that a capacitor be used to store or "memorize" the voltage drop across the series resistor.

A problem develops, however, when one attempts to memorize the range of voltages produced by the series resistor. The resistance R of the photoconductor may be represented as a function of brightness B as follows:

$$R = aB^{-\gamma}$$

where $a$ is a constant and $\gamma$ is a constant determined by the properties of the photoconductor. Thus, for the 17 stages of measuring range used in the EV (exposure value) system, if $\gamma$ is taken as equal to unity, the maximum value of R becomes $2^{17}$ or approximately $1.3 \times 10^5$ times the minimum value. Trying to memorize voltages varying over such a range is obviously difficult and entails very small changes in output for changes in light intensity.

In view of the foregoing, it is therefore an object of the present invention to provide an exposure measuring system wherein the above difficulties are largely eliminated.

The foregoing object and other advantages are achieved in the present invention wherein there is provided a linearizing circuit for use with a memory circuit. The linearizing network comprises a resistance network or semiconductor device, such as a diode, which transforms the exponential response into a linear one. Stated another way, the network converts the light intensity of the scene to be photographed into a voltage having a value essentially linear proportional to a logarithm of the value of said intensity. An exposure meter in accordance with the present invention would thus comprise a photoconductor in series with the linearizing means and coupled to a source of operating voltage. The memory element, typically a capacitor, is connected in parallel with the linearizing means. Other features of the present invention include the provision of a means for disconnecting the memory element during operation of the shutter and an indicator, connected in parallel with the memory element, mechanically coupled to a light intensity control member so that movement of the indicator controls the intensity of light incident upon the photoconductor.

The various features and advantages of the present invention may be more fully understood by considering the following detailed description in conjunction with the accompanying drawings, in which.

Figure 1:
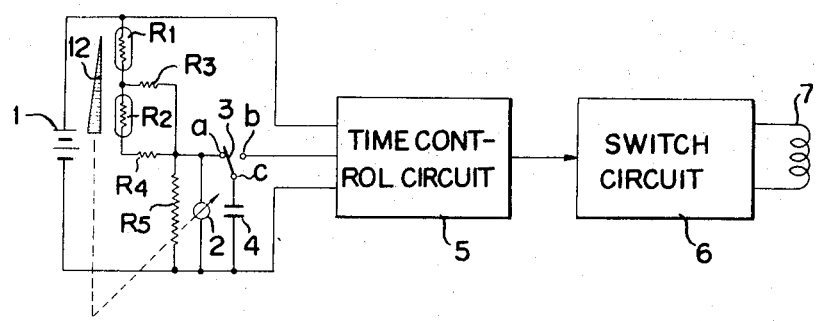
FIG. 1 shows an illustrative embodiment of a circuit of the present invention where a resistor is used.

Referring to FIG. 1, there is shown photoconductive elements $R_1$ and $R_2$ whose resistivities are a function of the brightness of the external field to be measured. $R_3$, $R_4$, and $R_5$ are fixed resistances. $R_3$ and $R_4$ act as proportioning devices and the resistance $R_4$ can sometimes be omitted, depending upon the amount of current through $R_2$. Element 1 is a source of operating potential and has series connected thereacross photoconductors $R_1$ and $R_2$ and fixed resistances $R_4$ and $R_5$. Fixed resistance $R_5$ converts into voltage variations the current variations produced by the changes in resistance of photoconductors $R_1$ and $R_2$ and has connected in parallel therewith indicator means 2 and series connected switch 3 and memory element 4, which is shown by way of example as comprising a capacitor. As shown in FIG. 1, switch 3 comprises three terminals in a single pole, double throw configuration. Terminal $a$ may be considered to be the memory side of switch 3 and connects capacitor 4 to the voltage producing resistance $R_5$. While it is so connected, capacitor 4 stores the voltage produced by $R_5$ which is portional to a logarithm of the amount of light incident upon photoconductors $R_1$ and $R_2$. When the shutter, which is mechanically coupled to switch 3 is activated, switch 3 then connects memory capacitor 4 to what may be called the read-out side of switch 3, terminal $b$. In this position, the voltage stored on memory capacitor 4 is presented to time control circuit 5. Time control circuit 5 controls the exposure time by means of a signal derived from the voltage accumulated on memory capacitor 4 and transforms the arithmetical or linear function of said signal into a geometrical or exponential function of exposure time. Time control circuit 5 has its output connected to a switch circuit 6, which, in turn, controls the shutter mechanism, thereby determining the exposure time. Switch circuit 6, in response to the exponential time control signal, energizes or de-energizes electromagnet 7 which may, for example, hold the rear screen of a focal plane shutter whereby the rear screen is enabled to run, closing the shutter mechanism.

Thus, it can be seen that by the present invention the extremely wide range of values normally presented by a photoconductor exposure meter has been reduced by linearizing the response of the meter. This linearized function is then readily stored on a capacitor memory which then can be switched between a memorizing mode and a read-out mode in accordance with the operation of the shutter mechanism. In this manner, any discontinuities induced by the mirror interfering with the light incident upon photoconductors $R_1$ and $R_2$ is obviated. Indicator 2 merely serves to indicate to the user the shutter speed determined by the measuring circuit.

When the resistivities of photoconductors $R_1$ and $R_2$ and resistances $R_3$, $R_4$, and $R_5$ are properly selected, the voltage drop across resistance $R_5$ will be changed from an exponential function to a linear function, relative to the change in external brightness. Thus, the range of values that must be accurately memorized by capacitor 4 is greatly narrowed.

Figure 2:
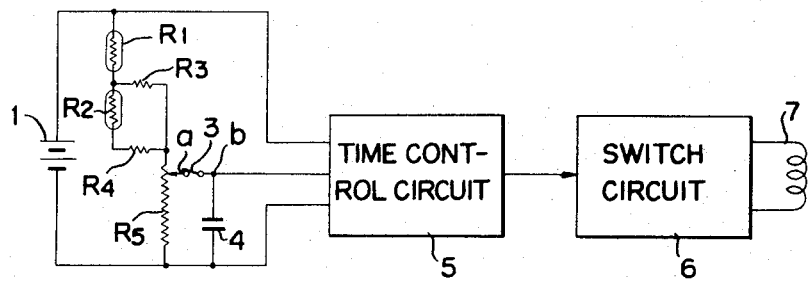
FIG. 2 and FIG. 3 show, respectively, modified embodiments of FIG. 1.

In FIG. 2 there is illustrated another embodiment of the present invention wherein the time control circuit is continuously connected to memory element 4 and, further, wherein resistance $R_5$ is a potentiometer. These two changes may be made independently, that is, one is not necessary with the other. By utilizing a potentiometer for resistance $R_5$, the sensitivity of the over-all system may be modified and a fixed proportion of the linear output voltage may be obtained.

Figure 3:
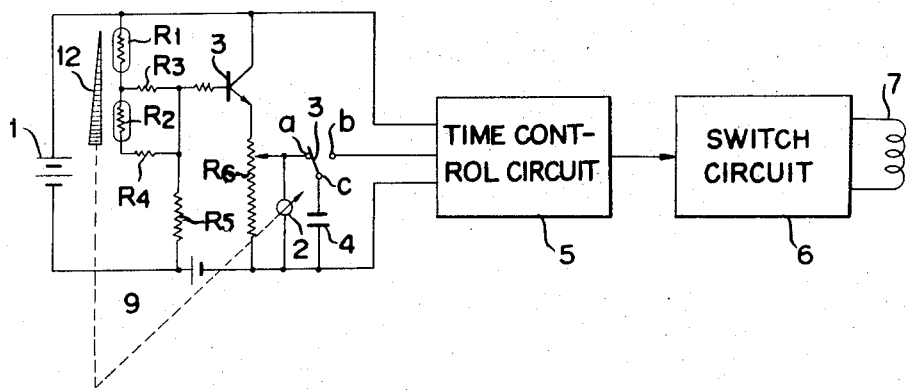

FIG. 3 illustrates another embodiment of the present invention wherein an emitter follower stage is interposed between resistor $R_5$ and the memory element capacitor. The emitter follower stage comprises transistor 8 having its base connected to resistance $R_5$, its collector connected directly to a source of operating potential and its emitter connected to output potentiometer $R_6$. Output potentiometer $R_6$ functions in the same manner as potentiometer $R_5$ in FIG. 2. Transistor 8 thus acts as a greatly reduced source impedance and enables one to obtain a quicker response by the memory element.

Voltage source 9, which is used in powering the emitter follower stage, may be omitted by restricting the measuring range or by replacing transistor 8, shown in the drawing as bi-polar, with a field effect transistor. Due to the isolation provided by transistor 8, the resistivity of potentiometer $R_6$ can be selected independently of the resistivities of photoconductors $R_1$ and $R_2$. Thus, if the resistivity of potentiometer $R_6$ is relatively small, the change in bias level caused by the addition of indicator 2 can be virtually ignored, provided indicator 2 has a relatively large internal resistance.

Figure 4:
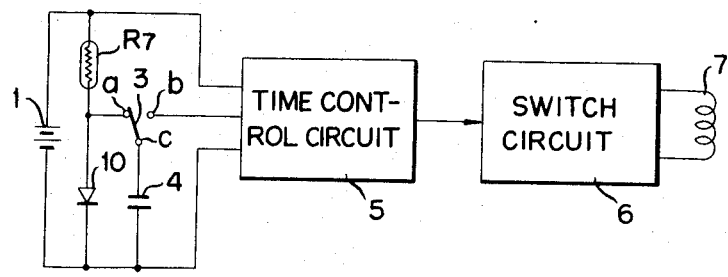
FIG. 4 shows another embodiment using a diode.

FIG. 4 illustrates another embodiment of the present invention wherein the response of the diode is used to convert the geometric or exponential response of the photoconductor into an arithmetical or linear response. Specifically in FIG. 4 photoconductor $R_7$ is series connected with diode 10 across a source of operating potential 1. The voltage drop across diode 10 is stored in the manner described in connection with FIG. 1. By utilizing a diode as shown in FIG. 4, an exponential-to-linear function converter is readily obtained by utilizing the square Law of response of the diode.

Figure 5:
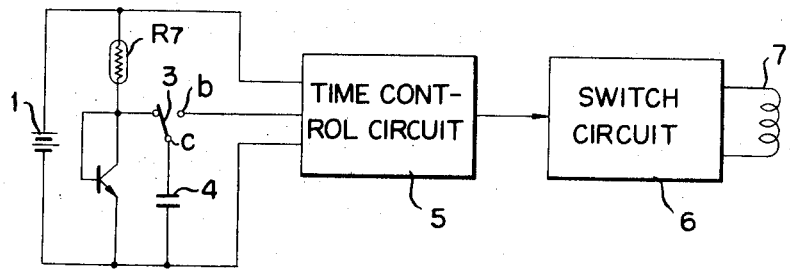
FIG. 5 shows another embodiment in which a transistor is used in place of the diode in FIG. 4.

FIG. 5 illustrates another embodiment of the present invention in which a transistor having its base and collector electrodes connected together is used to perform the same function as described above in connection with diode 10, as illustrated in FIG. 4.

Figure 6:
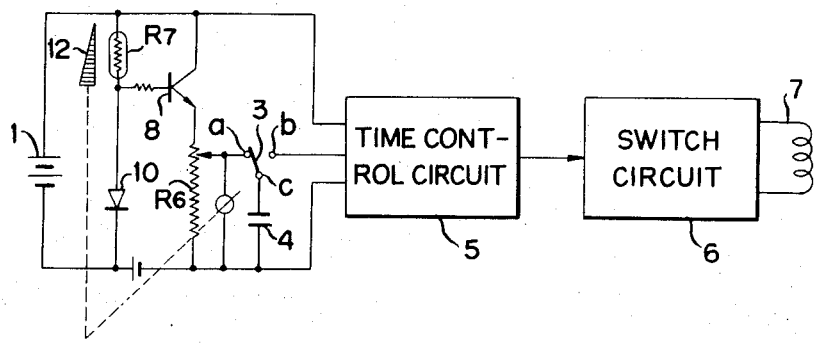
FIG. 6 shows a modification of FIG. 4.

FIG. 6 illustrated another embodiment of the present invention wherein the diode converter as utilized in FIG. 4 has added thereto an emitter follower circuit as utilized and described in connection with FIG. 3.

Also illustrated in FIGS. 1, 3, and 6 is an optical wedge 12 of the variable density type mechanically coupled to indicator 2. This coupling between indicator 2 and wedge 12 provides an electro-mechanical feedback system whereby non-linearities in the specific components utilized may be compensated.

Thus, it can be seen that the present invention provides a means whereby the exponential variations in external brightness may be readily converted to a voltage signal that is a linear function of the brightness and memorized. In this manner, variations in external brightness over a wide range may be readily stored within the exposure meter. Further, the sensitivity of the exposure meter in accordance with the present invention may be readily adjusted by dividing the linear of output voltage by a fixed amount and memorizing the quotient. Further, by providing an optical wedge between the light source and the photoconductors, variations in the system may be further compensated.

Having thus described the invention, it will be apparent to those of skill in the art that many modifications may be made within the spirit and scope of the present invention.

What is claimed is:

1. In a camera having an objective lens and a shutter moveable between closed and open positions, an exposure control arrangement comprising:
    light intensity to electric signal conversion means positioned behind said objective lens for converting essentially each value of the intensity of the light passing through said objective lens during use of said camera to a corresponding electric signal having a value essentially linearly proportional to a logarithm of said value of light intensity;
    memory means for storing said electrical signal;
    switch means for coupling said memory means to said conversion means during intervals when the light passing through said objective lens is incident on said conversion means and for disconnecting said memory means from said conversion means when light passing through said objective lens is not incident on said conversion means; and
    control means coupled to said memory means to control the open time of said shutter in accordance with the electrical signal stored in said memory means.

2. In a camera, an exposure control arrangement as in claim 1, wherein said memory means includes a capacitor and said conversion means includes means producing a voltage essentially linearly proportional to a logarithm of the value of the intensity of the light passing through said objective lens.

3. In a camera, an exposure control arrangement as in claim 2, wherein said conversion means includes photoconductor means responsive to the light passing through said objective lens and diode means series connected to said photoconductor means, said series connected photoconductor means and diode means being connected across a source of operating potential.

4. In a camera, an exposure control arrangement according to claim 3, wherein said diode means includes a transistor having base, emitter and collector electrodes, said base and collector electrodes being connected together.

5. In a camera, an exposure control arrangement according to claim 3, wherein said conversion means includes first and second series connected photoconductor means, said first and second photoconductor means being arranged to receive said light passing through said objective lens, first and second series connected resistance elements connected in parallel with said second photoconductor means, and a third resistance element connected to the junction of said series connected resistance elements.

6. In a camera having an objective lens and a shutter moveable between closed and open positions, an exposure control arrangement comprising:
    light responsive means for producing an output current related to the intensity of the light passing through said objective lens during use of said camera;

conversion means coupled to said light responsive means for producing a voltage which is essentially linearly proportional to a logarithm of the value of the intensity of light incident on said light responsive means;

capacitor memory means for storing said voltage;

switch means for coupling said capacitor memory means to said conversion means during intervals when light passing through said objective lens is incident on said light responsive means and for disconnecting said memory means from said conversion means when light passing through said objective lens is not incident on said light responsive means; and control means coupled to said capacitor memory means to control the open time of said shutter in accordance with the stored voltage in said capacitor memory means.

7. In a camera having an objective lens and a shutter moveable between closed and open positions, an exposure control arrangement comprising:

photoconductor means for producing an output current related to the intensity of the light passing through said objective lens during use of said camera;

a transistor for producing a voltage which is essentially linearly proportional to a logarithm of the value of the intensity of light incident on said photoconductor means, said transistor having base, emitter and collector electrodes, said base and collector electrodes being connected together;

means connecting said photoconductor means and said transistor in series connection across a source of operating potential;

capacitor memory means for storing said voltage;

switch means for coupling said capacitor memory means to said transistor during intervals when light passing through said objective lens is incident on said photoconductor means and for disconnecting said capacitor memory means from said conversion means when light passing through said objective lens is incident on said photoconductor means; and control means coupled to said capacitor memory means for controlling the open time of said shutter in accordance with the stored voltage in said capacitor memory means.

8. In a camera having an objective lens and a shutter moveable between closed and open positions, an exposure control arrangement comprising:

light intensity to voltage conversion means for converting essentially each value of the intensity of the light passing through said objective lens during use of said camera to a corresponding voltage which is essentially linearly proportional to a logarithm of the value of said intensity, said conversion means including a first photoconductor, a second photoconductor series connected to said first photoconductor, said first and second photoconductors being arranged to receive said light passing through sad objective lens, first and second series connected resistance elements connected in parallel with said second photoconductor, and a third resistance element connected to the junction of said series connected resistance elements;

capacitor memory means for storing said voltage;

switch means for coupling said capacitor memory means to said third resistor during intervals when light passing through said objective lens is incident on said first and second photoconductors and for disconnecting said memory means from said third resistor when light passing said objective lens is not incident on said first and second photoconductors; and control means coupled to said capacitor memory means to control the open time of said shutter in accordance with the stored voltage in said capacitor memory means.

9. In a camera having an objective lens and a shutter moveable between closed and open positions, an exposure control arrangement comprising:

light intensity to voltage conversion means for converting essentially each value of the intensity of the light passing through said objective lens during use of said camera to a corresponding voltage which is essentially linearly proportional to a logarithm of the value of said intensity, said conversion means including a first photoconductor, a second photoconductor series connected to said first photoconductor, said first and second photoconductors being arranged to receive said light passing through said objective lens, first and second series connected resistance elements connected in parallel with said second photoconductor, and a potentiometer connected to the junction of said series connected resistance elements;

capacitor memory means for storing said voltage;

switch means for coupling said capacitor memory means to said potentiometer during intervals when light passing through said objective lens is incident on said first and second photoconductors and for disconnecting said capacitor memory means from said potentiometer when light passing through said objective lens is not incident on said first and second photoconductors; and control means coupled to said capacitor memory means to control the open time of said shutter in accordance with the stored voltage on said capacitor memory means.

10. In a camera having an objective lens and a shutter moveable between closed and open positions, an exposure control arrangement comprising:

light intensity to voltage conversion means for converting essentially each value of the intensity of the light passing through said objective lens during use of said camera to a corresponding voltage which is essentially linearly proportional to a logarithm of the value of said intensity, said conversion means including a first photoconductor, a second photoconductor series connected to said first photoconductor, said first and second photoconductors being arranged to receive said light passing through said objective lens, first and second series connected resistance elements connected in parallel with said second photoconductor, and a third resistance element connected to the junction of said series connected resistance elements;

amplifying circuit means connected to said junction for providing an output voltage proportional to said voltage, capacitor memory means for storing said output voltage;

switch means for coupling said capacitor memory means to said amplifying means during intervals when light passing through said objective lens is incident on said first and second photoconductors and for disconnecting said capacitor memory means from said amplifying means when the light passing through said objective lens is not incident on said first and second photoconductors; and control means coupled to said capacitor memory means to control the open time of said shutter in accordance with the stored voltage in said capacitor memory means.

11. In a camera having an objective lens and a shutter moveable between closed and open positions, an exposure control arrangement comprising:

a photoconductor for producing an output current related to the intensity of the light passing through said objective lens during use of said camera;

a diode series connected with said photoconductor for producing a voltage which is essentially linearly proportional to a logarithm of the value of the intensity of the light incident on said photoconductor, said series connected diode and photoconductor being connected across a source of operating potential;

capacitor memory means selectively coupled to the junction of said photoconductor and said diode for storing at least a portion of said voltage; and control means for controlling the open time of said shutter in accordance with the stored voltage in said capacitor memory means.

12. In a camera, an exposure control arrangement as set forth in claim 11 further comprising:

an amplifying stage coupling said junction to said capacitor memory means, said amplifying stage being in the configuration of an emitter follower.

13. In a camera, an exposure control arrangement as set forth in claim 12, wherein said amplifying stage comprises:

a transistor having a control electrode and a potentiometer, having a tap, series connected across a source of operating potential, said control electrode of said transistor being coupled to said junction and the tap of said potentiometer being connected to said capacitor memory means.

* * * * *